United States Patent
Alexander et al.

(10) Patent No.: US 11,782,777 B1
(45) Date of Patent: Oct. 10, 2023

(54) PREVENTING EXTRANEOUS MESSAGES WHEN EXITING CORE RECOVERY

(71) Applicant: INTERNATIONAL BUSINESS MACHINES CORPORATION, Armonk, NY (US)

(72) Inventors: Gregory William Alexander, Pflugerville, TX (US); Deanna Postles Dunn Berger, Hyde Park, NY (US); Timothy Bronson, Round Rock, TX (US); Lior Binyamini, Holon (IL); Richard Joseph Branciforte, Austin, TX (US); Guy G. Tracy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/808,119

(22) Filed: Jun. 22, 2022

(51) Int. Cl.
| | |
|---|---|
| *G06F 11/00* | (2006.01) |
| *G06F 11/07* | (2006.01) |
| *G06F 11/20* | (2006.01) |
| *G06F 11/16* | (2006.01) |

(52) U.S. Cl.
CPC ...... *G06F 11/0724* (2013.01); *G06F 11/0757* (2013.01); *G06F 11/202* (2013.01); *G06F 11/1608* (2013.01)

(58) Field of Classification Search
CPC ............. G06F 11/0724; G06F 11/0757; G06F 11/1608; G06F 11/202
See application file for complete search history.

(56) References Cited

U.S. PATENT DOCUMENTS

| | | | |
|---|---|---|---|
| 8,635,492 B2 | 1/2014 | Gara | |
| 10,496,574 B2 | 12/2019 | Fleming | |
| 10,725,848 B2 | 7/2020 | Kurts | |
| 10,841,785 B2 | 11/2020 | Yamada | |
| 2013/0191690 A1* | 7/2013 | Busaba | G06F 11/24 714/37 |
| 2014/0025991 A1* | 1/2014 | Anandavally | G06F 11/16 714/E11.061 |
| 2014/0053019 A1* | 2/2014 | Holley | G06F 11/2092 714/E11.061 |

FOREIGN PATENT DOCUMENTS

CN 111581003 A 8/2020

OTHER PUBLICATIONS

Beskow, et al., "Reducing Game Latency by Migration, Core-Selection and TCP Modifications," Int. J. of Advanced Media and Communication, Nov. 2010, ResearchGate, pp. 1-20, <https://www.researchgate.net/publication/220610511_Reducing_game_latency_by_migration_core-selection_and_TCP_modifications>.

(Continued)

*Primary Examiner* — Michael Maskulinski
(74) *Attorney, Agent, or Firm* — Caleb Wilkes

(57) ABSTRACT

A method and a computer system for core recovery management are provided. A first operation signal is generated via a first hardware agent. The first operation signal indicates that the first hardware agent is processing an operation requested by a first processor core. The first processor core receives a first extend fence signal based on the generated first operation signal. As long as the first extend fence signal is received via the first processor core, the first processor core is kept in a fenced state for core recovery.

20 Claims, 7 Drawing Sheets

(56) References Cited

OTHER PUBLICATIONS

Disclosed Anonymously, "Efficient Persistence and Recovery of Transaction Data with Transformation," IP.com Prior Art Database Technical Disclosure, IP.com No. IPCOM000198962D, Aug. 19, 2010, 4 pgs.

Disclosed Anonymously, "Market Data Message Recovery and Synchronization," IP.com Prior Art Database Technical Disclosure, IP.com No. IPCOM000232557D, Nov. 15, 2013, 6 pgs.

Mell et al., "The NIST Definition of Cloud Computing", National Institute of Standards and Technology, Special Publication 800-145, Sep. 2011, pp. 1-7.

Unknown, "Distributed Messages Recovery Using Heart Beat Mechanism to Detect Failing System Component," IP.com Prior Art Database Technical Disclosure, IP.com No. IPCOM000190465D, Dec. 1, 2009, 3 pgs.

* cited by examiner

PREVENTING EXTRANEOUS MESSAGES WHEN EXITING CORE RECOVERY

BACKGROUND

The present invention relates generally to computer hardware that is used in computer systems such as servers or mainframes and that include processors that read and execute software code that is input thereto.

SUMMARY

According to one exemplary embodiment, a method for core recovery management is provided. A first operation signal is generated via a first hardware agent. The first operation signal indicates that the first hardware agent is processing an operation requested by a first processor core. The first processor core receives a first extend fence signal based on the generated first operation signal. As long as the first extend fence signal is received via the first processor core, the first processor core is kept in a fenced state for core recovery. A computer system configured to operate according to the method described above is also disclosed herein.

According to another exemplary embodiment, a computer system includes a first processor core and a first hardware agent. The first hardware agent is configured to generate and transmit a first operation signal without receiving a fenced signal from the first processor core. The first operation signal indicates that the first hardware agent is processing an operation requested by the first processor core.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
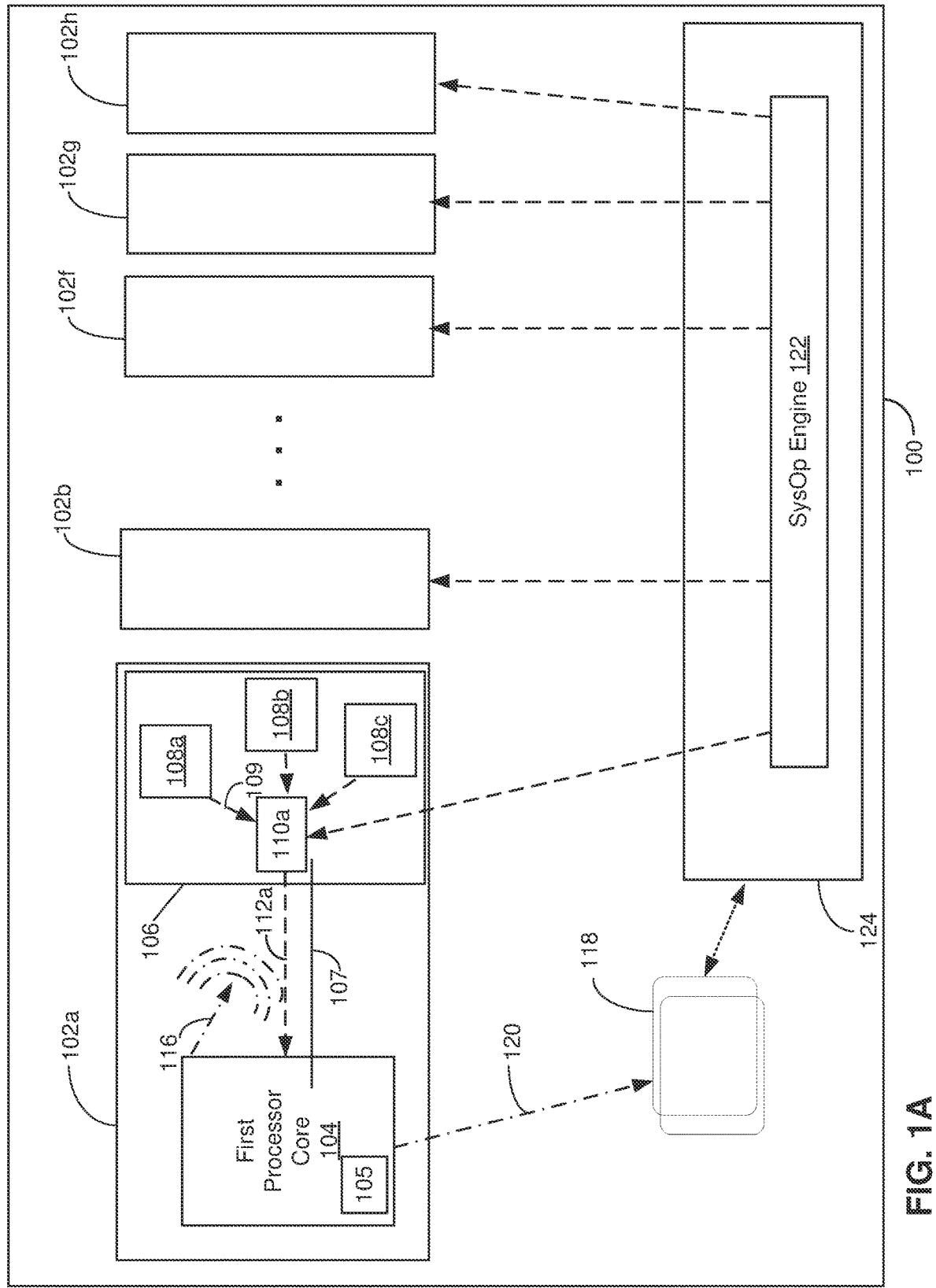
FIG. 1A is a block diagram illustrating hardware components and their fence extend interactions in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a computer system and method for improving management of processor operations during core recovery and/or during circuit error recovery. A mainframe is a large computer used by organizations for critical applications, bulk data processing, and/or large-scale transaction processing. A mainframe may be utilized as a type of server, although all servers are not mainframes and all servers are not created to be equal. A mainframe may help power clouds, build industries, and fuel innovation by enhancing computing power. A mainframe may be implemented as part of a hybrid cloud to preserve privacy of data, achieve cyber resilience, and implement and deploy developed cloud-native capabilities. It is advantageous to build the mainframes with super resilient computing systems when critical organization tasks depend on the mainframe. Shutdowns and crashes for a mainframe hosting the work of a large organization could be disastrous.

The present embodiments help improve the processing methods of core recovery. To improve computing resiliency, a processor core of a server or mainframe undergoes a process called core recovery when the core detects that it has entered an erroneous state. Such erroneous state may occur due to entry of a radioactive particle which flipped a bit (or caused another erroneous state), due to power fluctuations in the power supply for the server, or due to other reasons. The core recovery seeks to restore the processor core to its last known good state and condition which constitute the last instance, also known as a checkpoint, when the processor was known to have a safe operation. The core recovery will include shutting down new processing actions and not continuing such new processing actions until the processor core is restored to the safe state. After the successful completion of the core recovery, the restored processor will resume new processing actions. Managing processor requests around and during the time of core recovery helps achieve the successful recovery and avoids upsetting the processor in the recovered state. If outstanding operations such as fetch requests or system operations are returned to the recovered processor, the recovered processor may not recall requesting these operations and may be sent into an invalid or mis-correlated state with information presented that does not mesh with the recovered state.

The present embodiments help improve core recovery management and, therefore, the resiliency of a computing system. The present embodiments help avoid undesired chasing of outstanding requests, help avoid bugs, help avoid undesired signals such as a "saw recovery" state being added to critical timing paths, help avoid a requirement to modify controllers to a "saw recovery" state, and help reduce verification effort that has been experienced with core recovery management. The present embodiments help avoid the generation of extraneous signals during core recovery and when exiting the core recovery process. The present embodiments help improve management of signals between a processor core and the nest. The nest includes computing portions exterior to the processor core and may include, but are not limited to, a cache hierarchy, memory, and input/output components. The present embodiments incorporate a designed waiting period or delay in order to improve core management and request management during core recovery. The present embodiments provide a simpler way of verifying this enhancement of core recovery, because the extend fence signal is checkable during normal operation and not only during recovery testing.

For the present embodiments, as long as the first processor core continues to receive an extend fence signal from its hardware agents and/or members of the nest, the processor core remains and/or is kept in a fenced state for core recovery. In the fenced state, the processor core ignores messages that are sent by the nest, e.g., from certain controllers, cache memory, a sysop engine, etc. By remaining in the fenced state while receiving the extend fence signal, the processor core allows its outstanding requests to be completed by the agents but avoids the confusion that would result if the processor core were to receive completion messages regarding those requests after the exiting of the recovery process. The extension of the recovery process helps ensure that such completion messages are received during the recovery process. By avoiding this confusion from such extraneous messages, the processor core avoids being sent into an invalid or mis-correlated state, namely by avoiding a late reception of information that if presented to the processor core after recovery would not mesh with the recovered state.

A processor core as described herein may include a single integrated circuit such as a superscalar processor. The processor core may read and execute software instructions. The processor core may include an instruction fetch unit, an instruction decode unit, an instruction issue unit, a load/store unit (LSU), an operand address generation unit, a fixed point unit (or any other execution unit(s)), and other components such as various other execution units, registers, buffers, memories, and other functional units that are all formed by integrated circuitry Referring now to FIG. 1A, a fence extend hardware architecture 100 in accordance with an embodiment of the present invention is shown. The fence extend hardware architecture 100 may be part of a server and/or a mainframe that may be a hub for a hybrid cloud architecture. The fence extend hardware architecture 100 that is depicted may include a processor chip that may be disposed in one or more modules and/or drawers of a mainframe. The fence extend hardware architecture includes a number of execution blocks including a first execution block 102a, a second execution block 102b, a third execution block 102f, a fourth execution block 102g, and a fifth execution block 102h. Additional execution blocks may be present in the fence extend hardware architecture 100, although only five are depicted in FIG. 1A. Each of the execution blocks includes a processor core and a memory cache attached to the processor core. FIG. 1A shows these details for the first execution block 102a, but the remaining execution blocks will also include a respective processor core and a respective memory cache attached to that respective processor core. FIG. 1A shows that the first execution block 102a includes a first processor core 104 and a first memory cache 106 connected to the first processor core 104. A core-cache connection 107 is also shown in FIG. 1A. The first memory cache 106 in the depicted embodiment is a private memory cache for the first processor core 104. In at least some embodiments, the first memory cache 106 is an L3 cache.

The first memory cache 106 in the depicted embodiment includes multiple controllers such as the first controller 108a, the second controller 108b, and the third controller 108c. These controllers may be local fetch controllers (LFAR controllers) that work solely on behalf of the first processor core 104 and may output a single operation signal, e.g., a "core active" signal. Other embodiments may include controllers which may perform requests, including fetching, on behalf of multiple processor cores and which may output multiple operation signals, e.g., multiple "core active" signals. The first processor core 104 is configured to make operation requests and send these operation requests to the multiple controllers for execution. The operation requests may include fetch requests, write requests, etc. The first controller 108a, the second controller 108b, and the third controller 108c are configured to perform the operation requests and to notify the first processor core 104 after the requested operation is completed.

Also on the processor chip the fence extend hardware architecture 100 in the depicted embodiment includes a fabric logic 124 with a system operation engine also referred to as a sysop engine 122. The sysop engine 122 includes a state machine to perform complex operations on behalf of one or more processor cores. Operations performed by the sysop engine 122 may include moving large blocks of memory, clearing regions of memory, and/or putting the system into special states such as a quiesced state. The fabric logic 124 is configured to output a "core active" signal for each of the processor cores for which the sysop engine 122 could operate including the first processor core 104.

Also on the processor chip the fence extend hardware architecture 100 in the depicted embodiment includes a first buffer 118. In this depicted embodiment, the first buffer 118 is a ring snoop buffer which holds requests that have been sent from the first processor core 104 to external nodes such as the system operation engine 122 and/or to external cache, and that may not reach the destination agent within a known, bounded amount of time.

As will be explained in more detail below with respect to the processes of FIGS. 2 and 3, the present embodiments may help improve core recovery management for a processor core such as the first processor core 104. Thus, the present embodiments may help improve the resiliency of a computing system which contains the hardware components configured according to the present embodiments. In the embodiment depicted in FIG. 1A, the present embodiments help avoid the generation of extraneous signals during and when exiting core process recovery for the first processor core 104 and also for other processor cores of the other execution blocks 102b, 102f, 102g, and/or 102h. The first processor core 104 consumes an extend fence signal and extends a recovery reset while the extend fence signal is set. If recovery occurs in phases, the extend fence signal causes the first processor core 104 to extend recovery phases in which the core state is being reset and in which other incoming responses from the nest are ignored.

For the embodiment depicted in FIG. 1A, one or more of the controllers and the sysop engine 122 generates a respective operation signal. The respective operation signal indicates that this element is processing an operation requested by the first processor core 104. Thus, the controller(s) and the sysop engine 122 will have received a request from the first processor core 104 to perform an action. The controller(s) and the sysop engine 122 will begin to execute the action. While the action is being executed, the controller(s) and the sysop engine 122 will generate the respective operation signal and will transmit this generated respective operation signal. The first controller 108a in FIG. 1A has its operation signal labeled as the first operation signal 109. The operation signal may also be referred to as a "core active" signal indicating that the respective hardware agent, in this instance the first controller 108a, is working on behalf of that first processor core 104.

The sysop engine 122 may also perform operations that are requested by other processor cores such as the respective processor cores of the second execution block 102b, the third execution block 102f, the fourth execution block 102g, and the fifth execution block 102h. The sysop engine 122 may generate multiple operation signals, specifically one operation signal for each processor for which the sysop engine 122 is performing a request. FIG. 1A depicts this aspect with multiple dashed arrows being emitted from the sysop engine 122 and extending to a particular one of the execution blocks. One dashed arrow in FIG. 1A represents an operation signal transmitted by the sysop engine 122 to the first extend fence collection logic 110a to indicate that the sysop engine 122 is performing a request on behalf of the first processor core 104.

Similar to the sysop engine 122, a systems operation controller may output a signal for each core for whom they are fulfilling requests. A shared local fetch controller (SL-FAR) may, similar to the sysop engine 122 and to the systems operation controller, output a signal for each processor core for which they are fulfilling requests.

The first processor core 104 receives an extend fence signal that is based on the generated first operation signal. In a simple embodiment, the generated first operation signal constitutes the extend fence signal. In an embodiment as shown in FIG. 1A with multiple controllers, the first extend fence signal 112a is generated when at least one of the controllers or the sysop engine 122 or other hardware agent is still performing an operation that was requested by the first processor core 104 and is sending the operation signal. In an embodiment as shown in FIG. 1A a first extend fence collection logic 110a may act as a funnel point for multiple hardware agents sending signals back to the first processor core 104. The first extend fence collection logic 110a includes logic that generates and transmits the first extend fence signal 112a if one or more of multiple hardware agents communicating with the first extend fence collection logic 110a is generating the respective operation signal. Thus, the first extend fence collection logic 110a includes OR logic so that the first extend fence collection logic 110a ceases generating the first extend fence signal 112a only if none of the hardware agents in the nest is performing an action that was requested by the first processor core 104.

As long as the first processor core continues to receive the first extend fence signal 112a, the first processor core 104 remains and/or is kept in a fenced state for core recovery. In the fenced state, the first processor core 104 ignores messages that are sent by the nest, e.g., from the controller(s) such as the first controller 108a, the second controller 108b, the third controller 108c, the shared cache memory 114, and the sysop engine 122. By remaining in the fenced state while receiving the first extend fence signal 112a, the first processor core 104 allows its outstanding requests to be completed by the agents but avoids the confusion that would result if the first processor core 104 were to receive completion messages regarding those requests after the exiting of the recovery process. By avoiding this confusion from such extraneous messages, the first processor core 104 avoids being sent into an invalid or mis-correlated state, namely by avoiding a late reception of information that if presented to the processor core after recovery would not mesh with the recovered state.

The above was described with respect to the first processor core 104, but other respective extend fence signals may also be generated for other processor cores in the other execution blocks shown in FIG. 1A, e.g., in the second, third, fourth, and/or fifth execution blocks 102b, 102f, 102g, 102h. These other extend fence signals may also prolong a recovery process and a recovery phase of these other processor cores in these other execution blocks. The guiding principles, logic, and arrangements may be implemented in these other execution blocks to provide the same features and outcomes as are achieved with the first processor core 104 of the first execution block 102a.

Figure 1B:
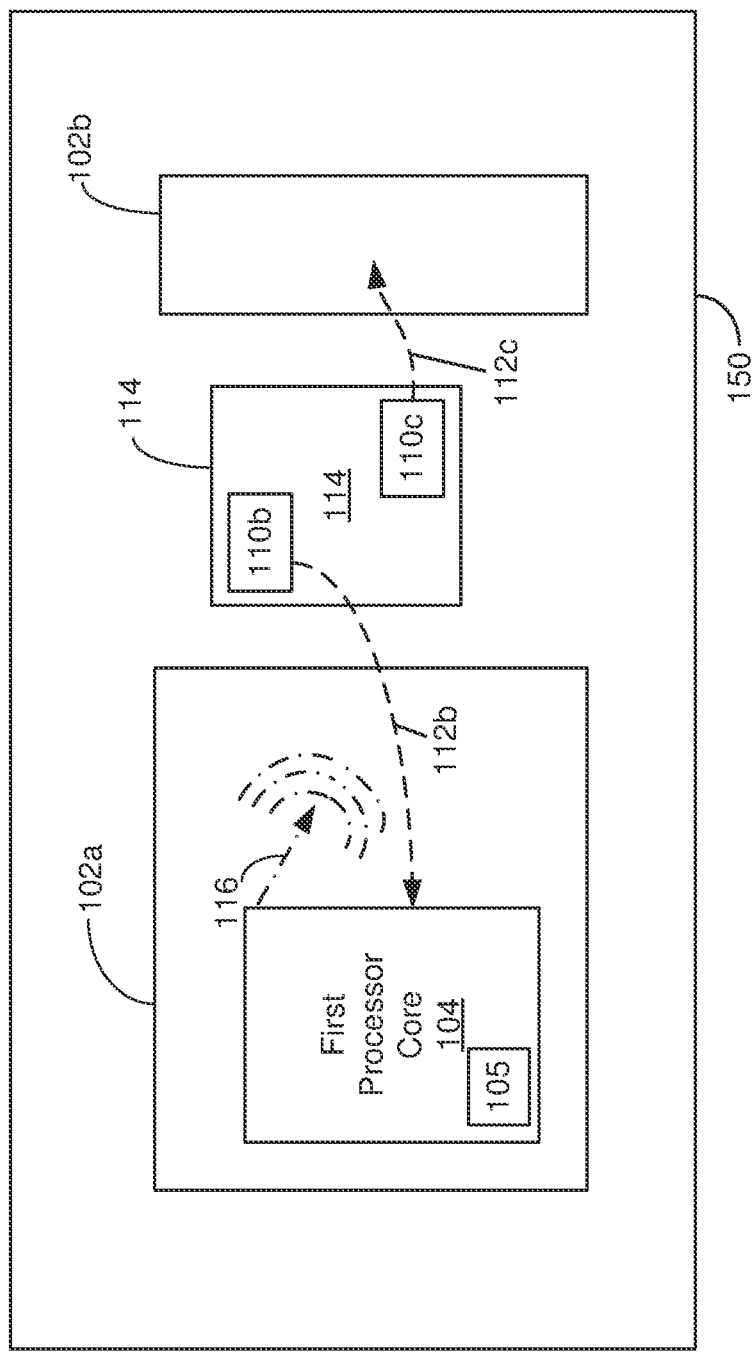
FIG. 1B is another block diagram illustrating hardware components and their fence extend interactions in accordance with another embodiment that has a shared cache memory.

FIG. 1B shows an alternative embodiment with an alternative extend fence architecture 150 which is similar to the extend fence architecture 100 shown in FIG. 1 but includes a shared cache memory 114 that is shared by multiple processor cores including the first processor core 104 and the processor core of the second execution block 102b. The shared cache memory 114 may hold data sent from private cache memories and from the main memory. The shared cache memory 114 includes multiple controllers and a first processor fence collection logic 110b and a second processor fence collection logic 110c. The multiple controllers may send operation signals to the first processor fence collection logic 110b when the respective controller is performing an operation that was requested by the first processor core 104. The first processor fence collection logic 110b may, in response to receiving at least one of the operation signals regarding the first processor core 104, generate the first processor extend fence signal 112b and transmit same to the first processor core 104. The multiple controllers may also send operation signals to the second processor fence collection logic 110c when the respective controller is performing an operation that was requested by the processor core of the second execution block 102b. The second processor fence collection logic 110c may, in response to receiving at least one of the operation signals regarding the processor core of the second execution block 102b, generate the second processor extend fence signal 112c and transmit same to the processor core of the second execution block 102b. Although FIG. 1B shows the shared cache memory 114 being shared via two processor cores, in other embodiments a shared cache memory may be shared by more than two processor cores.

While the system of FIGS. 1A and 1B are used to provide illustration of extend fence architectures in which at least some of the present embodiments are implemented, the depicted architectures are not limiting and are intended to provide examples of suitable computing hardware in which the techniques of the present embodiments are applied. It should be appreciated that FIGS. 1A and 1B do not imply any limitations with regard to the hardware architecture in which different embodiments may be implemented. Many modifications to the depicted hardware architectures may be made based on design and implementation requirements.

Figure 2:
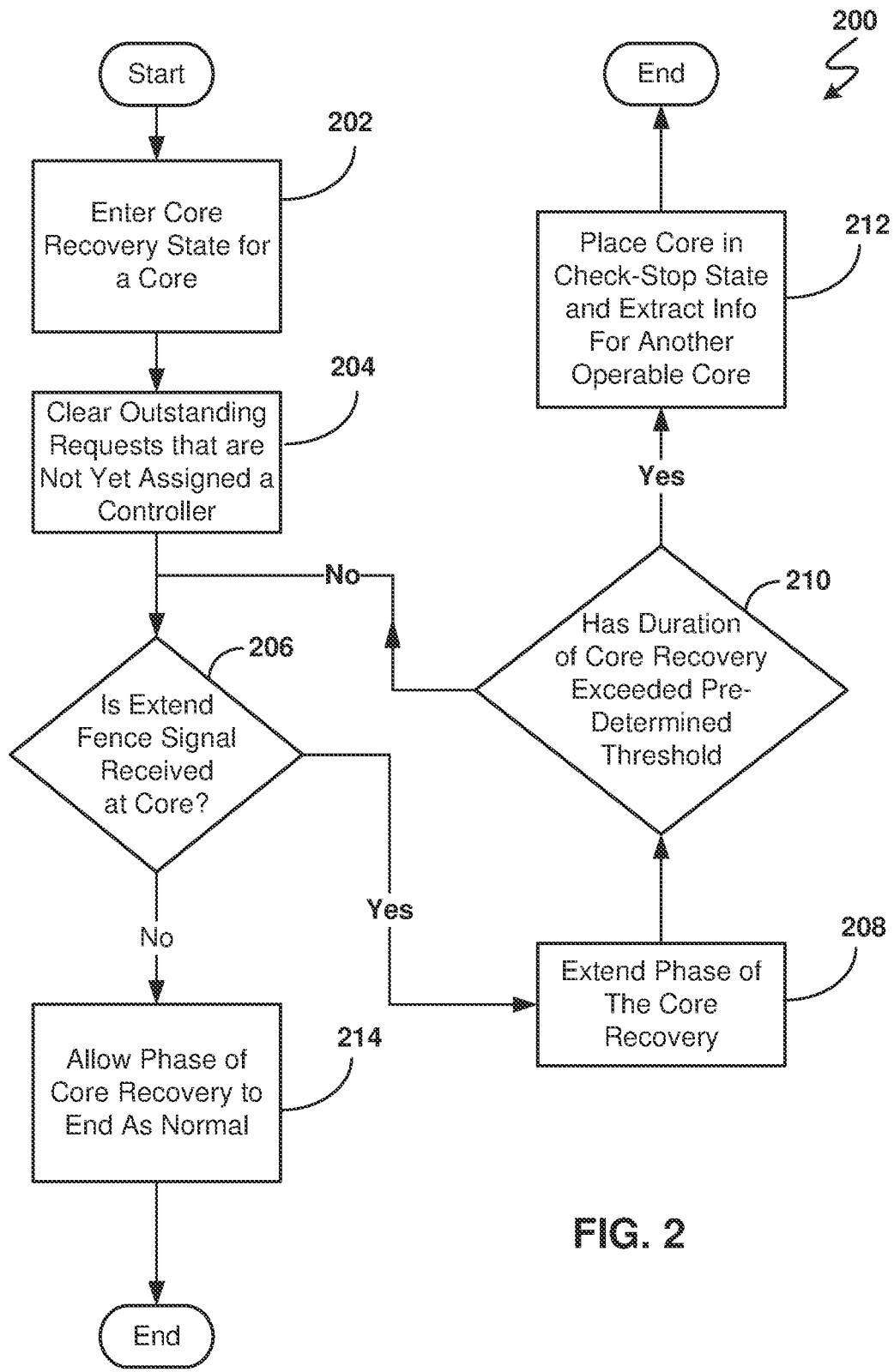
FIG. 2 is an operational flowchart illustrating a first fence extend process from the processor point-of-view according to at least one embodiment.

FIG. 2 illustrates an operational flowchart illustrating a first fence extend process 200 according to at least one embodiment. The first fence extend process 200 is related to the steps and components that were shown with the extend fence architecture 100 shown in FIG. 1A and described above and may also relate to the steps and components that were shown with the alternative extend fence architecture 150 shown in FIG. 1B and described above. The first fence extend process 200 relates to the point of view for the processor core, e.g., the first processor core 104, for the performance of the extend fence process. FIG. 3 shows a second fence extend process 300 according to at least one embodiment and which also relates to the components and steps shown in FIG. 1A and may also relate to the steps and components that were shown with the alternative extend fence architecture 150 shown in FIG. 1B and described above. In contrast to the first fence extend process 200, however, the second fence extend process 300 relates to the point of view of the hardware agent instead of to the point of view of the processor core.

In a step 202 of the first fence extend process 200, a core recovery state for a processor core is entered. For step 202 the first processor core 104 shown in FIGS. 1A and 1B may enter a core recovery state. To improve computing resiliency, a processor core of a server or mainframe may undergo a process called core recovery when the core detects that it has entered an erroneous state. Such erroneous state may occur due to entry of an alpha particle which flipped a bit or due to other reasons. The core recovery seeks to restore the processor core to its last known good state and condition which constitute the last instance, also known as a checkpoint, when the processor was known to have a safe operation. The core recovery will include shutting down new processing actions and not continuing such new processing actions until the process is restored to the safe state. After the successful completion of the core recovery, the restored processor will resume new processing actions.

In a step 204 of the first fence extend process 200, outstanding requests that are not yet assigned a controller are cleared. This step 204 for the embodiment depicted in FIG. 1A includes the first processor core 104 generating and transmitting a request invalidation command 120 to the buffer 118. The request invalidation command 120 invalidates all operation requests from the first processor core 104 that are still within the buffer 118, e.g., are stuck within the buffer 118, and invalidates those requests before they exit the buffer 118 and arrive at an intended hardware agent for execution. The buffer 118 may be a ring buffer. The requests may be queued up in the buffer 118 and not yet assigned a particular controller, e.g., a systems operation controller, for execution. These requests in the buffer 118 may not reach an agent, e.g., a controller, for execution within a bounded time. These requests may be stuck in the buffer 118 for an indeterminate amount of time. For example, these requests may not reach a controller within three cycles and this delay may produce complications for the core that exits recovery. Thus, invalidating, e.g., dropping, of these requests may help avoid generation of undesired completion messages that may be sent back to the first processor core 104 after the first processor core 104 successfully completes and exits recovery. The requests that were still in the buffer were not being executed yet via a hardware agent, so invalidating or canceling these requests helps provide recovery efficiency. The extend fence process(es) described herein may, except for these invalidations of not-assigned requests, achieve the avoidance of sending such request cancellation messages to various hardware agents that have received operation requests from the core that is entering core recovery. These cancellation pursuits may result in asynchronous resetting of a controller. The invalidation to the buffer 118 is much simpler, resulting in an improved core recovery process.

In some embodiments, this step 204 includes the first processor core 104 generating and transmitting another request invalidation command to another component such as a stalling pipeline in addition to or alternatively to the buffer 118. When in such a stalling pipeline the requests from the first processor core 104 also have not yet been assigned an agent for execution and/or may not reach an agent for execution within a bounded time.

In some instances, the fenced signal 116 constitutes the request invalidation command 120. As explained above, the fenced signal 116 is generated via the first processor core 104 in response to the first processor core 104 beginning core recovery or beginning a phase of recovery in which the core is fenced. Those embodiments which include the first processor core 104 generating the fenced signal 116 may have power and bandwidth-saving benefits by having the fenced signal 116 constitute the request invalidation command 120. Thus, in this embodiment if the first buffer 118 receives the fenced signal 116 indicating that the first processor core 104 is entering core recovery, the first buffer 118 knows to invalidate any requests from the first processor core 104 that are still within the first buffer 118. These requests that are still within the first buffer may have not yet exited the first buffer 118, e.g., due to a lack of being assigned to a particular controller for execution. The recovery state machine 105 of the first processor core 104 may generate the fenced signal 116 and/or the request invalidation command 120.

In a step 206 of the first fence extend process 200, a determination is made as to whether an extend fence signal is received at the processor core. A receiver of the first processor core 104 may determine whether the first processor core 104 is receiving a first extend fence signal 112a. This first extend fence signal 112a may be transmitted via a communication channel between the first processor core 104 and the first memory cache 106. The first memory cache 106 is connected to the first processor core 104 so that at least one core-cache connection 107 is present for transmitting the first extend fence signal 112a as well as other communications from the first memory cache 106 to the first processor core 104. If the determination is affirmative that an extend fence signal is being received at the processor core, the first fence extend process 200 proceeds to step 208. If the determination is negative in that no extend fence signal is being received at the processor core, the first fence extend process 200 proceeds to step 214.

In a step 208 of the first fence extend process 200, a phase of the core recovery is extended. This extension of the core recovery may occur for the first processor core 104 shown in FIGS. 1A and 1B. Recovery in the core may be accomplished using a recovery state machine within the respective processor core, e.g., using the first recovery state machine 105 that is within the first processor core 104. During some phases of recovery, the core will ignore messages that are sent by the nest (except for the extend fence signals). The core is considered to be fenced during this state of ignoring. This fencing may include blocking some signals sent by the nest from reaching the respective processor core circuit. By remaining in the fenced state during recovery, the first processor core 104 avoids the confusion, an invalidated state, and a mis-correlated state that may result if the first processor core 104 were to receive completion messages that do not mesh with its restored state.

The core recovery process may include prior phases, such as an error detection phase and a drain store phase, in which the core is not fenced. After detection of the error, the core stops generating new instructions. After initiation of core recovery, for the drain store phase a processor core drains any completed stores and sends these completed stores elsewhere, e.g., to lower level cache and/or to the nest. This draining requires back and forth communication between the processor core and the nest, which means that the draining is completed before the fence of the processor core is initiated. The draining may include telling the store instructions to complete their operation. The core communicates this information to the first level of cache that is outside the core. The core may hold a latest copy of some data and, therefore, may need to send each of its latest copies out before shutting off communication with the nest. Sending the copies out in this manner helps avoid having the latest copies to be lost in the recovery. The latest copies may be sent to other caches and/or to main memory.

As part of step 208, the core does not proceed to a subsequent phase which allows back-and-forth communication with the nest until the extend fence signal is off. This prolonging of the phase allows all requests that have been sent by this core before the recovery to be processed by the nest. Allowing the processing instead of cancelling avoids penalties of tracking down all outstanding requests for invalidation/cancellation. Allowing these outstanding requests to finish processing helps the system achieve processing and computing benefits that might otherwise be lost during core changes during core recovery. A subsequent phase of core recovery may include a restored register checking phase. Back-and-forth communication between the core and the nest may occur in one or more of these subsequent phases of core recovery.

In at least some embodiments, the core provides a fenced indicator to the nest. In the embodiments depicted in FIGS. 1A and 1B, the first processor core 104 generates and transmits a fenced signal 116 to the nest, e.g., to external components such as the controllers in the first memory cache 106, the shared cache memory 114, and the sysop engine 122. In these embodiments, this reception of the fenced indicator helps the nest know to generate the operation signals and the fence extend signal when they are performing an outstanding request for the core. In other embodiments, the nest generates the operation signals and the fence extend signal at all times when they are performing a request for the core, even at times not during core recovery. The core may ignore the extend fence signals that the core receives outside of a time period in which core recovery for itself occurs. In embodiments in which the nest generates the operation signals and the fence extend signals at all times, these signals can be tested during normal operation testing, in addition to during recovery testing.

In a step 210 of the first fence extend process 200, a determination is made as to whether the duration of the core recovery has exceeded a pre-determined threshold. The first recovery state machine 105 may include a timer that tracks the duration of the core recovery process. The timer may start timing when the core recovery process is triggered and begun, e.g., upon detection of an error. The first recovery state machine 105 may include a comparator and a stored value of a pre-determined time threshold for acceptable duration of core recovery. The first recovery state machine 105 may compare the current duration of the core recovery to the stored value of the pre-determined threshold as part of step 210. The timer and the comparator together may be part of timing logic. If the determination is affirmative that the duration of the core recovery has exceeded the pre-determined threshold, the first fence extend process 200 proceeds to step 212. If the determination is negative in that the duration of the core recovery has not exceeded the pre-determined threshold, the first fence extend process 200 proceeds back to step 206 for a repeat of step 206.

In a step 212 of the first fence extend process 200, the core is placed in a check-stop state and information is extracted from the core for transferring to another operable processor core. The check-stop state for the core indicates that the core is considered to be unrecoverable. As part of step 212, a message may be generated and transmitted to central error collection logic. The central error collection logic may trigger core sparing logic to extract information from this core. The extracted information may be moved to another core that is in a good state, e.g., is operable. This core transfer may be implemented in resilient processing systems. In less resilient systems, the recovery error might cause the system to take more drastic response mechanisms such as intentionally check-stopping the entire system.

In a step 214 that occurs with a negative determination in step 206 of the first fence extend process 200, the phase of the core recovery is allowed to end as normal. This normal end includes no further prolonging of this phase of the core recovery. Step 214 occurs if the determination of step 206 is negative in that no extend fence signal is being received at the processor core. The core may then proceed to subsequent phases of the recovery such as a restored register checking phase. The core may additionally or alternatively proceed to new standard processing in its renewed/recovered state. Thus, based on the first fence extend process 200 the step 214 is not performed until all requests sent by the core before recovery have been processed by the nest.

The second fence extend process 300 relates also to the extend fence process but relates to the point of view of the hardware agent instead of to the point of view of the processor core. Thus, the second fence extend process 300 (agent point of view) has significant overlap and interplay with the first fence extend process 200 (processor point of view).

In a step 302 of the second fence extend process 300, a notification that the core has entered a core recovery state is received. In the embodiments depicted in FIGS. 1A and 1B, the first processor core 104 generates and transmits a fenced signal 116 to the nest, e.g., to external components such as the controllers in the first memory cache 106, the shared cache memory 114, and the sysop engine 122 when or after the first processor core 104 enters a core recovery process. In these embodiments, this reception of the fenced indicator, e.g., of the fenced signal 116, helps the nest know to generate the operation signals and the fence extend signal when one or more components of the nest performs an outstanding request for the core. The various components may receive the fenced signal 116 as a part of step 302. Generating and transmitting the operation signal is simpler than changing to a "don't send to core" state in response to receiving the fenced signal 116 from the processor core.

In some embodiments, step 302 is not performed and the second fence extend process 300 begins with step 304. In this alternative, a first extend fence signal 112*a* may be generated via the hardware agents even when the processor core is not in a recovery state.

In a step 304 of the second fence extend process 300, a determination is made as to whether one or more of the hardware agents is performing an outstanding request from the processor core. Each hardware agent may include a respective request queue indicating which requests have been received, which operations from those requests have been started, and the progress of those operations. In the embodiment depicted in FIG. 1A the hardware agents may include the first, second, and third controllers 108*a*, 108*b*, 108*c* in the first memory cache 106, the shared cache memory 114, and the sysop engine 122. In the embodiment depicted in FIG. 1A the processor core related to the outstanding request of step 304 may be the first processor core 104 or one of the unshown processor cores in one of the other execution blocks 102b, 102f, 102g, and 102h. If the determination is affirmative that one or more of the hardware agents is performing an outstanding request from the processor core, the second fence extend process 300 proceeds to step 304. If the determination is negative in that none of the hardware agents is performing an outstanding request for the processor core, the second fence extend process 300 proceeds to step 306.

In a step 306 of the second fence extend process 300, an extend fence signal is generated and sent to the processor core.

FIG. 1A shows a first extend fence signal 112a being generated via the first extend fence collection logic 110a and transmitted to the first processor core 104. This first extend fence signal 112a lets the first processor core 104 know to prolong the core recovery phase until the hardware agent performing this outstanding request completes the operation. The first extend fence collection logic 110a may act as a funnel point for multiple hardware agents that are sending signals back to the first processor core 104. The first extend fence collection logic 110a includes logic that generates and transmits the first extend fence signal 112a if one or more of multiple hardware agents generates and transmits the respective operation signal. Thus, the first extend fence collection logic 110a includes OR logic so that the first extend fence collection logic 110a ceases to drive the first extend fence signal 112a only if none of the hardware agents in the nest is performing an action that was requested by the first processor core 104. FIG. 1A shows the first controller 108a sending a first operation signal 109 to the first extend fence collection logic 110a to indicate that the first controller 108a is performing an outstanding request that was requested by the first processor core 104. The second and third controllers 108b and 108c may likewise send operation signals to the first extend fence collection logic 110a to indicate that the second and third controllers 108b, 108c, respectively, are performing a respective outstanding request that was requested by the first processor core 104. The sysop engine 122 may also generate and send its own operation signal that is received by the first extend fence collection logic 110a to indicate that the sysop engine 122 is performing an outstanding request that was requested by the first processor core 104. The first extend fence collection logic 110a may include logic such as l3_core_extend_fence⇐any_l3_lfar_vld OR fb_ex0_extend_fence. The last clause of this OR logic refers to the operation signal transmitted by the sysop engine 122. Receiving any of these operation signals causes the extend fence collection logic 110a to generate and transmit the first extend fence signal 112a.

FIG. 1B shows an alternative embodiment with an alternative extend fence architecture 150 which is similar to the extend fence architecture 100 shown in FIG. 1 but includes a shared cache memory 114 that is shared by multiple processor cores including the first processor core 104 and the processor core of the second execution block 102b. The shared cache memory 114 includes multiple controllers, a first processor extend fence collection logic 110b, and a second processor extend fence collection logic 110c. The multiple controllers may send operation signals to the first processor extend fence collection logic 110b when the respective controller is performing an operation that was requested by the first processor core 104. The multiple controllers may also send operation signals to the second processor extend fence collection logic 110c when the respective controller is performing an operation that was requested by the processor core of the second execution block 102b. The first processor extend fence collection logic 110b includes logic that generates and transmits the first processor extend fence signal 112b if one or more of multiple hardware agents generates and transmits the respective operation signal regarding the first processor core 104 to the first processor extend fence collection logic 110b. Thus, the first processor extend fence collection logic 110b includes OR logic so that the first processor extend fence collection logic 110b ceases generating the first processor extend fence signal 112b only if none of the hardware agents in the nest, e.g., the controllers in the shared cache memory 114, is performing an action that was requested by the first processor core 104. The second processor extend fence collection logic 110c includes logic that generates and transmits the second processor extend fence signal 112c if one or more of multiple hardware agents generates and transmits the respective operation signal regarding the processor of the second execution block 102b to the second processor extend fence collection logic 110c. Thus, the second processor extend fence collection logic 110c includes OR logic so that the second processor extend fence collection logic 110c ceases generating the second processor extend fence signal 112c only if none of the hardware agents in the nest, e.g., the controllers in the shared cache memory 114, is performing an action that was requested by the processor core of the second execution block 102b.

The alternative extend fence architecture 150 of FIG. 1B is, for purposes of simplicity, shown with a smaller nest, i.e., with fewer components in the nest, than are present for the extend fence architecture 100 of FIG. 1A. Nevertheless, the alternative extend fence architecture 150 may include its own sysop engine, one or more buffers, and additional execution blocks and controllers as well.

Thus, with this alternative feature a single shared cache memory is configured to generate and transmit a respective extend fence signal to multiple processor cores. Although FIG. 1B depicts the shared cache memory 114 operating to have two extend fence collection logics and to send two separate extend fence signals for two processor cores, respectively, in other embodiments a shared cache memory may have more than two extend fence collection logics and may send respective extend fence signals to more than two processor cores.

In an alternate unshown embodiment with both a private memory cache and a shared memory cache having an extend fence relationship with a particular processor core, the processor core itself may include OR fence signal receiving logic. With this OR fence signal receiving logic, if a fence signal is received from either the private memory cache or from the shared memory cache the particular processor core will prolong the core recovery, e.g., the phase of the core recovery, until an extend fence signal is no longer received from any source, e.g., from neither the private memory cache nor from the shared memory cache. In other embodiments, the extend fence signal from the shared memory cache may be used by extend fence collection logic in the private memory cache, such that the extend fence signal from the private memory cache will be generated and sent if the extend fence signal from the shared memory cache is sent.

After step 306, the second fence extend process 300 returns for a repeat of the determination of step 304. Thus, a loop continues until none of the hardware agents is performing an outstanding request from the processor core, i.e., until the determination of step 304 is negative. This loop illustrates the prolonging aspect that the processor core will achieve in order to improve the core recovery. By generating the extend fence signal in step 306, the step 208 of the first fence extend process 200 (processor core point-of-view) continues which extends the phase of the core recovery. This corresponding loop in the first fence extend process 200 runs through steps 206, 208, and 210. The loop (steps 304 and 306) in the second fence extend process 300 ends with a negative determination in step 304 and the performance of step 308, and this ending triggers the end of the loop (206, 208, 210) in the first fence extend process 200. The hardware agents continue to send the extend fence signal until there are no longer any agents performing outstanding requests. At that point, the extend fence signal is dropped (see step 308 below) and then the process proceeds to the END state. Because the core is being held in recovery, at that stage there will not be any new requests.

In a step 308 of the second fence extend process 300, an extend fence signal is not generated and is not sent to the processor core.

This step 308 may be performed with the embodiment shown in FIG. 1A when the first extend fence collection logic 110a ceases to generate and ceases to send the first extend fence signal 112a. Thus, the first processor core 104 will no longer receive any extend fence signal and will no longer receive the first extend fence signal 112a and will allow the core recovery, e.g., the core recovery phase, to end without additional prolonging to wait for outstanding requests to be performed by the hardware agents.

This step 308 may be performed with the embodiment shown in FIG. 1B when the first processor extend fence collection logic 110b ceases to generate and ceases to send the first processor extend fence signal 112b. Thus, the first processor core 104 will no longer receive any extend fence signal and will no longer receive the first processor extend fence signal 112b and, therefore, will allow the core recovery, e.g., the core recovery phase, to end for the first processor core 104 without additional prolonging to wait for outstanding requests to be performed by the hardware agents. Such additional prolonging at that point is unnecessary because no outstanding requests from this first processor core 104 are still in the system.

This step 308 may also separately be performed with the embodiment shown in FIG. 1B when the second processor extend fence collection logic 110c ceases to generate and ceases to send the second processor extend fence signal 112c. Thus, the processor core of the second execution block 102b will no longer receive any extend fence signal and will no longer receive the second processor extend fence signal 112c and, therefore, will allow the core recovery, e.g., the core recovery phase, to end for the processor core of the second execution block 102b without additional prolonging to wait for outstanding requests to be performed by the hardware agents. Such additional prolonging at that point is unnecessary because no outstanding requests from this processor core of the second execution block 102b are still in the system.

Thus, the execution of step 308 from the second fence extend process 300 (hardware agent point of view) causes a negative determination in step 206 in the first extend fence process 200 which then causes the performance of the step 214 from the first fence extend process 200 (processor core point of view). This normal end to the fence extend process by the processor core includes no further prolonging of the current phase of the core recovery. The core may then proceed to subsequent phases of the recovery such as a restored register checking phase. The core may alternatively or additionally proceed to new standard processing in its renewed/recovered state. Thus, based on the fence extend processes the recovery will not be finished until all requests sent by the core before recovery have been processed by the nest.

After step 308, the second fence extend process 300 proceeds to the END state which matches the first fence extend process 200 proceeding to the END state after step 214. Because the core is being held in recovery, at that stage there will not be any new responses from the nest that were generated to respond to pre-recovery requests from this particular processor core.

The first extend process 200 and the second extend process 300 are both mostly described with respect to the core recovery of a single processor core. As, however, was explained with respect to FIG. 1B, in at least some embodiments, the first extend process 200 and the second extend process 300 may be performed with respect to a first core and one or more other processor cores simultaneously within a single computing system, e.g., module, drawer, and/or server.

Figure 3:
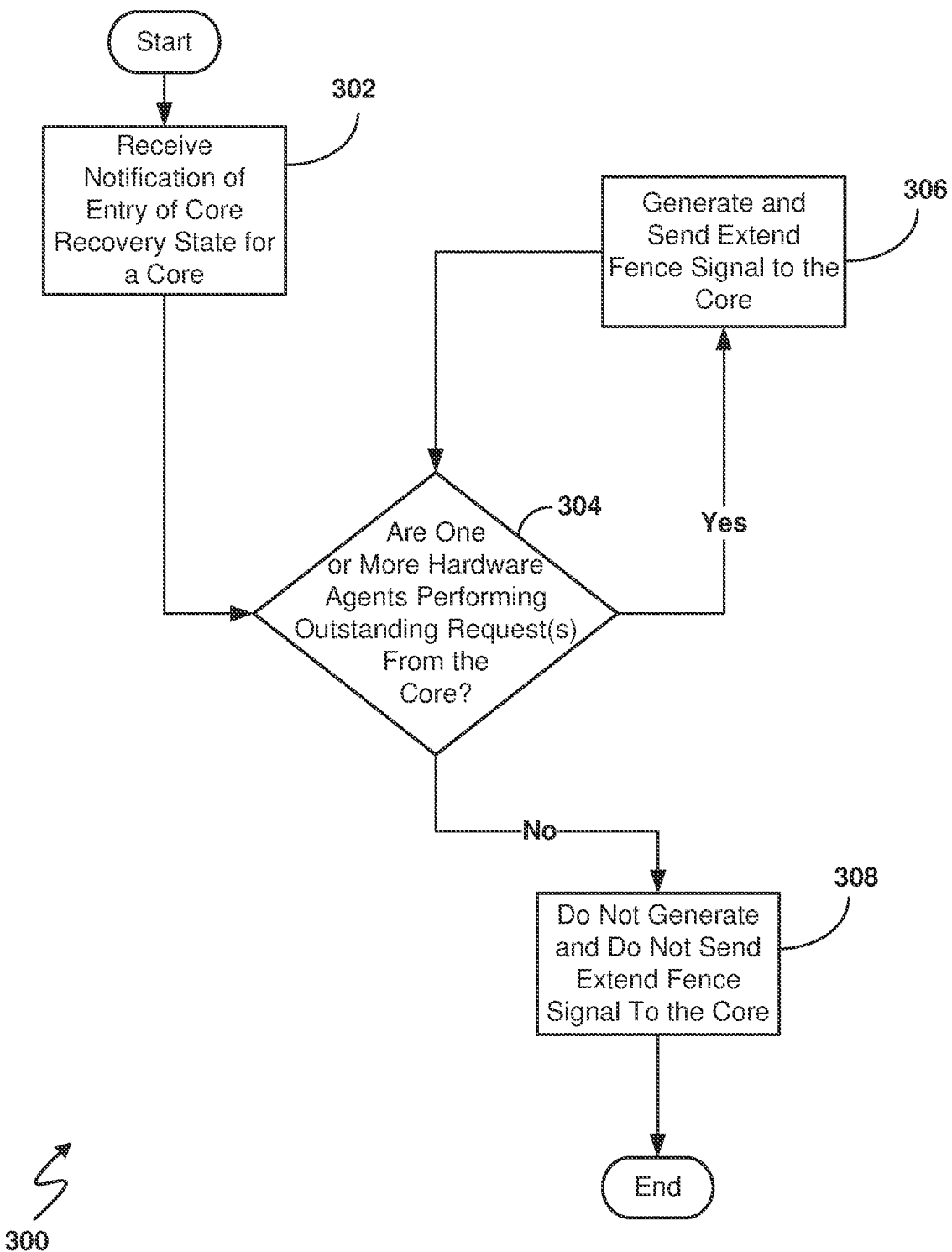
FIG. 3 is an operational flowchart illustrating a second fence extend process from the hardware agent point-of-view according to at least one embodiment.

It may be appreciated that FIGS. 2 and 3 provide only illustrations of some embodiments and do not imply any limitations with regard to how different embodiments may be implemented. Many modifications to the depicted embodiment(s), e.g., to a depicted sequence or inclusion of steps, may be made based on design and implementation requirements.

Figure 4:
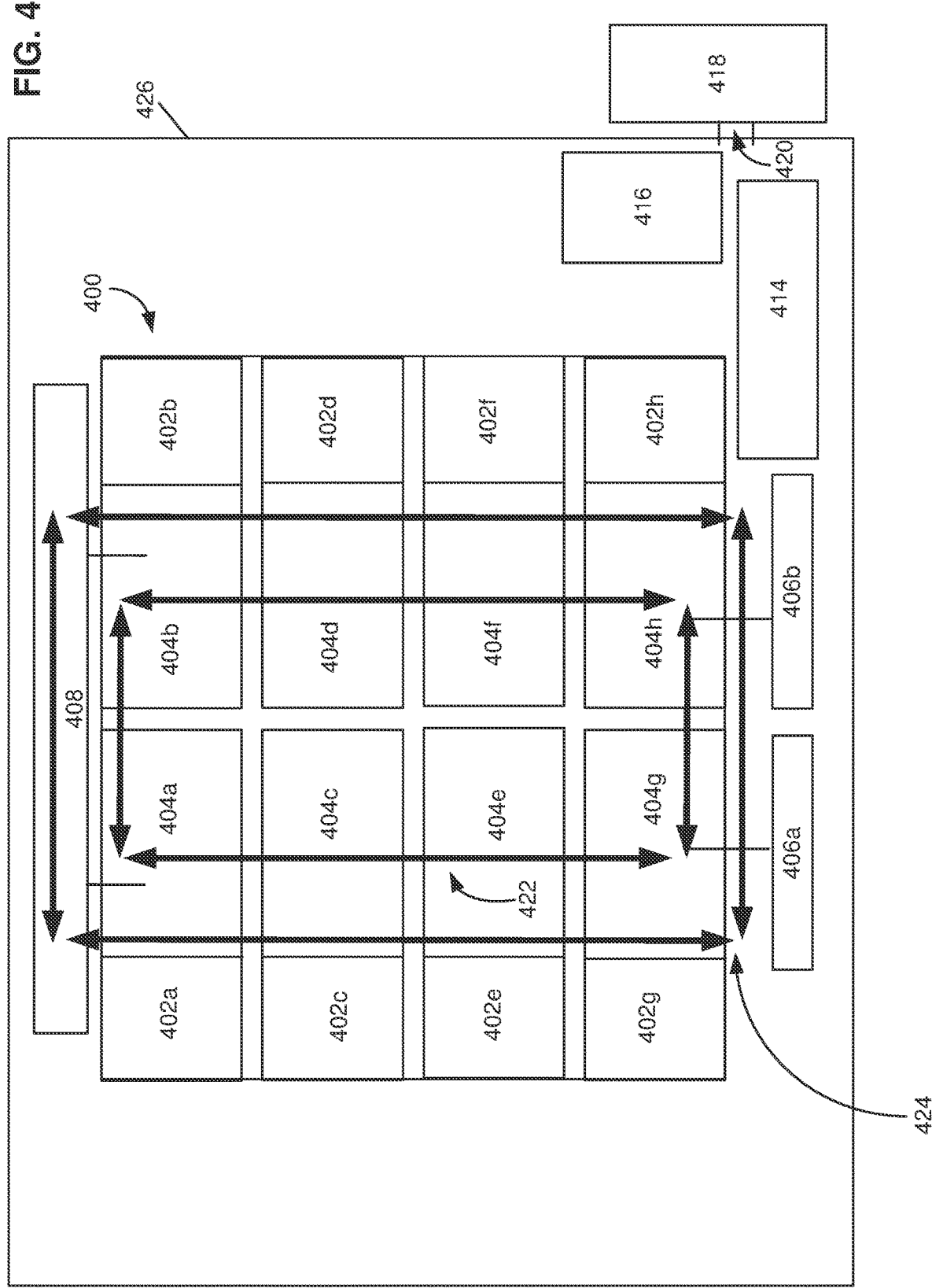
FIG. 4 is a processor chip architecture according to at least one embodiment and in which hardware may be configured according to the embodiments depicted in FIGS. 1A and/or 1B.

FIG. 4 is a processor chip architecture which includes multiple processor cores, each designed with the core recovery prolonging features that are described above with respect to FIGS. 1A, 1B, 2, and 3. FIG. 4 shows various components including a motherboard portion 426 which holds a first processor chip 400 which includes eight processor cores that are designed with the prolonging features of the first processor core 104 shown in FIG. 1. Other controllers and nest features as were depicted in and described for FIGS. 1A, 1B, 2, and 3 may be present in the first processor chip 400.

The first processor chip 400 in the depicted embodiment is divided into eight processor cores, namely a first other processor core 402a, a second processor core 402b, a third processor core 402c, a fourth processor core 402d, a fifth processor core 402e, a sixth processor core 402f, a seventh processor core 402f, and an eighth processor core 402g. Each of the processor cores has its own private cache memory. Specifically, the first processor core 402a has a first private cache 404a. The second processor core 402b has a second private cache 404b. The third processor core 402c has a third private cache 404c. The fourth processor core 402d has a fourth private cache 404d. The fifth processor core 402e has a fifth private cache 404e. The sixth processor core 402f has a sixth private cache 404f. The seventh processor core 402g has a seventh private cache 404g. The eighth processor core 402h has an eighth private cache 404h. Each of the individual processor cores may directly communicate with its own private cache.

Each of the individual processor cores may communicate with other caches within the first processor chip 400 via various ring topology communication paths. Each of the individual processor cores may communicate with other caches within the second processor chip 400 of a same shared first module via a first ring topology communication path 422. The first ring topology communication path 422 passes via a first intra-module bus 406a and a second intra-module bus 406b from the first processor chip 400 to a second processor chip. Each of the individual processor cores may communicate with other caches within other processor chips of a first drawer, namely with the processor chips of other modules of the first drawer, via a second ring topology communication path 424. The second ring topology communication path 424 passes via an intra-drawer bus 408 from the first processor chip 400 to other processor chips within the first drawer but outside of the first module.

FIG. 4 shows that the eight processor cores of the first processor chip 400 have access to a first main memory region 418. Other processor chips of the first drawer and those included within any working partition that encompasses the first drawer and extends to other drawers may share this first main memory region 418 with the first processor chip 400. The other chips, however, must access the first main memory region 418 via the first processor chip 400 and via the first memory port 420 to the first main memory region 418. Thus, the other chips must communicate with and through the first processor chip 400 to access this first main memory region 418. The other chips have, likewise, their own respective main memory region which are shared with the other chips including with the first processor chip 400 but that must be accessed via and through the associated chip. FIG. 4 shows that the first processor chip 400 has access to a memory coherence directory 414 and a memory control unit 416.

Figure 5:
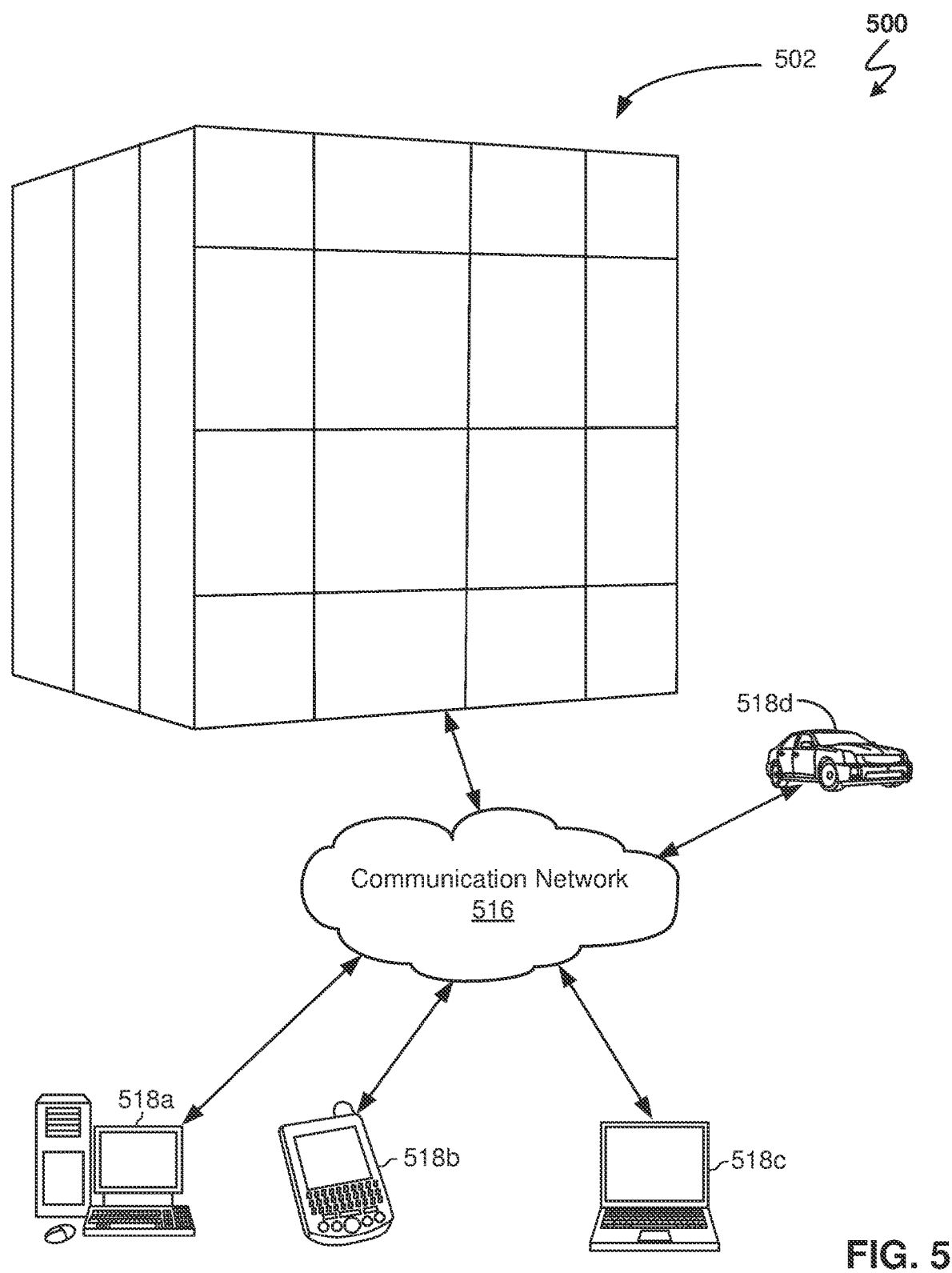
FIG. 5 is a block diagram illustrating a hybrid cloud environment which implements a mainframe in accordance with at least one embodiment which implements the fence extend architecture as, for example, depicted in FIGS. 1A and/or 1B.

FIG. 5 is a block diagram illustrating a hybrid cloud environment 500 which implements a mainframe 502 in accordance with at least one embodiment. A mainframe such as the mainframe 502 is a large computer used by organizations for critical applications, bulk data processing, and/or large-scale transaction processing. A mainframe is a type of server, although all servers are not mainframes and all servers are not created to be equal. The mainframe 502 may help power clouds, build industries, and fuel innovation by enhancing computing power. The mainframe 502 may be implemented as part of a hybrid cloud to preserve privacy of data, achieve cyber resilience, and implement and deploy developed cloud-native capabilities.

The mainframe 502 may include resilient processing systems such as drawers and modules which include processors designed with the recovery phase management features that are described above. For example, the mainframe 502 may include the processor and nest components that are shown in the extend fence architecture 100 that was shown in FIG. 1A and/or the alternative extend fence architecture 150 that was shown in FIG. 1B.

The computing/processing project may be carried out by a variety of other computing nodes which access software and data stored on the mainframe 502. For example, various cloud computing nodes 518 which communicate to operate programs using the mainframe 502 may include computing devices used by cloud consumers, such as, for example, personal digital assistant (PDA) or cellular telephone 518*b*, desktop computer 518*a*, laptop computer 518*c*, and/or automobile computer system 518*d*. These various nodes may communicate with one another and with the mainframe 502 via the communication network 516. The cloud computing nodes may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 518*a-d* shown in FIG. % are intended to be illustrative only and that computing nodes 518 and cloud computing environment 500 can communicate with any type of computerized device over any type of network and/or network addressable connection (e.g., using a web browser).

The communication network 516 may include various types of communication networks, such as a wide area network (WAN), local area network (LAN), a telecommunication network, a wireless network, a public switched network and/or a satellite network. The communication network 516 may facilitate communication of the various cloud computing nodes 518 and the mainframe 502, and particularly to processor chips and memory within the mainframe 502 and various drawers and/or modules of the mainframe 502. The communications network 516 may include connections, such as wire, wireless communication links, or fiber optic cables.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

While the hybrid cloud environment 500 of FIG. 5 is used to provide an illustration of an environment in which processors with the described core recovery management of the present embodiments is implemented, it is understood that the depicted environment is not limiting and is intended to provide an example of a suitable computer environment in which the techniques of the present embodiments are applied. It should be appreciated that FIG. 5 does not imply any limitations with regard to the environment in which different embodiments may be implemented. Many modifications to the depicted environment may be made based on design and implementation requirements.

Figure 6:
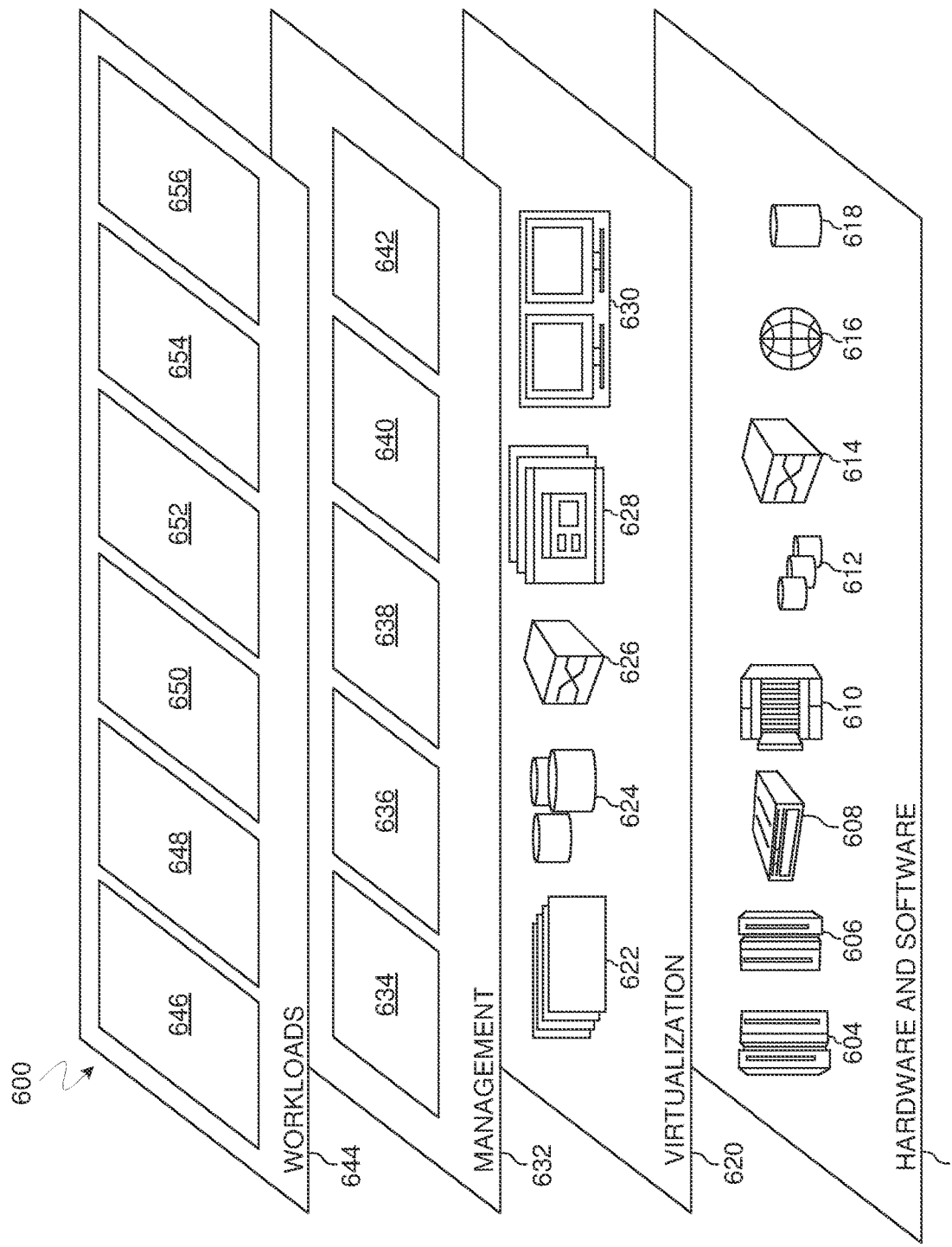
FIG. 6. FIG. is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 602 includes hardware and software components. Examples of hardware components include: mainframes 604; RISC (Reduced Instruction Set Computer) architecture based servers 606; servers 608; blade servers 610; storage devices 612; and networks and networking components 614. In some embodiments, software components include network application server software 616 and database software 618.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 632 may provide the functions described below. Resource provisioning 634 provides dynamic procurement of computing resources and other resources that are utilized to perform tasks within the cloud computing environment. Metering and Pricing 636 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 638 provides access to the cloud computing environment for consumers and system administrators. Service level management 640 provides cloud computing resource allocation and management such that required service levels are met. Service Level Agreement (SLA) planning and fulfillment 642 provide pre-arrangement for, and procurement of, cloud computing resources for which a future requirement is anticipated in accordance with an SLA.

Workloads layer 644 provides examples of functionality for which the cloud computing environment may be utilized. Examples of workloads and functions which may be provided from this layer include: mapping and navigation 646; software development and lifecycle management 648; virtual classroom education delivery 650; data analytics processing 652; transaction processing 654; and mobile desktop 656.

The flowchart and block diagrams in the Figures illustrate the architecture, functionality, and operation of possible implementations of systems and methods according to various embodiments of the present invention. In this regard, each block in the flowchart or block diagrams may represent a module, segment, or portion of logic, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for core recovery management, the method comprising:
   generating a first operation signal via a first hardware agent, the first operation signal indicating that the first hardware agent is processing an operation requested by a first processor core;
   receiving, via the first processor core, a first extend fence signal based on the generated first operation signal; and
   as long as the first extend fence signal is received via the first processor core, keeping the first processor core in a fenced state for core recovery.

2. The method of claim 1, wherein as long as the first extend fence signal is received via the first processor core, the first processor core is kept in the fenced state for the core recovery via keeping a recovery state machine in the first processor core in the fenced state.

3. The method of claim 1, further comprising:
   generating a second operation signal via the first hardware agent, the second operation signal indicating that the first hardware agent is processing an operation requested by a second processor core;
   receiving, via the second processor core, a second extend fence signal based on the generated second operation signal; and
   as long as the second extend fence signal is received via the second processor core, keeping the second processor core in a fenced state for core recovery.

4. The method of claim 1, further comprising:
   in response to the first processor core entering the fenced state, transmitting, via the first processor core, an invalidation request to a first buffer to invalidate any request that is from the first processor core and within the first buffer.

5. The method of claim 1, wherein the first hardware agent is selected from a group consisting of a first controller and a systems operation engine.

6. The method of claim 1, further comprising:
   tracking a duration of the fenced state for the first processor core; and
   in response to the duration exceeding a pre-determined threshold, placing the first processor core into a check-stop state and extracting information from the first processor core.

7. The method of claim 1, further comprising generating a second operation signal via a second hardware agent, the second operation signal indicating that the second hardware agent is processing another operation requested by the first processor core; wherein the first extend fence signal is based on the generated second operation signal.

8. The method of claim 1, further comprising:
   generating a second operation signal via a second hardware agent, the second operation signal indicating that the second hardware agent is processing another operation requested by the first processor core;
   receiving, via an extend fence collection logic, at least one of the first operation signal and the second operation signal; and
   in response to the receiving the at least one of the first operation signal and the second operation signal, generating, via the extend fence collection logic, the first fence extend signal and transmitting the first fence extend signal to the first processor core.

9. The method of claim 1, further comprising generating a fenced signal via the first processor core in response to the first processor core entering the core recovery.

10. A computer system comprising:
    a first processor core and a first hardware agent;
    the first hardware agent being configured to generate and transmit a first operation signal indicating that the first hardware agent is processing an operation requested by the first processor core; and
    the first processor core being configured to remain in a fenced state for core recovery, as long as the first processor core receives a first fence extend signal based on the generated first operation signal.

11. The computer system of claim 10, wherein the first processor core comprises a recovery state machine configured to control the core recovery and to keep the first processor core in the fenced state as long as the first processor core receives the first fence extend signal.

12. The computer system of claim 10, further comprising a second processor core;
    wherein:
       the first hardware agent is configured to generate and transmit a second operation signal indicating that the first hardware agent is processing an operation requested by the second processor core; and
       the second processor core is configured to remain in a fenced state for core recovery, as long as the second processor core receives a second fence extend signal based on the generated second operation signal.

13. The computer system of claim 10, further comprising a first buffer, wherein, in response to entering the fenced state, the first processor core is configured to transmit an invalidation request to the first buffer to invalidate any request that is from the first processor core and within the first buffer.

14. The computer system of claim 10, wherein the first hardware agent is selected from a group consisting of a first controller and a systems operation engine.

15. The computer system of claim 10, further comprising timer logic configured to track a duration of the core recovery and to trigger entry of a check-stop state for the first processor core in response to the duration of the core recovery exceeding a pre-determined threshold.

16. The computer system of claim 10, further comprising a second hardware agent;
    the second hardware agent being configured to generate a second operation signal indicating that the second hardware agent is processing another operation requested by the first processor core; and
    the first extend fence signal is based on the generated second operation signal.

17. The computer system of claim 10, further comprising a second hardware agent and an extend fence collection logic, the second hardware agent being configured to generate a second operation signal indicating that the second hardware agent is processing another operation requested by the first processor core;

the extend fence collection logic being configured to receive at least one of the first operation signal and the second operation signal; and the extend fence collection logic being configured to, in response to the receiving the at least one of the first operation signal and the second operation signal, generate the first fence extend signal and to transmit the first fence extend signal to the first processor core.

18. The computer system of claim 10, wherein the first processor core is configured to generate and transmit a fenced signal in response to the first processor core entering the core recovery.

19. A computer system comprising:

a first processor core and a first hardware agent;

the first hardware agent being configured to generate and transmit a first operation signal without receiving a fenced signal from the first processor core, the first operation signal indicating that the first hardware agent is processing an operation requested by the first processor core.

20. The computer system of claim 19, wherein the first processor core is configured to ignore a fence extend signal when the first processor core is not in core recovery, and wherein the fence extend signal is based on the first operation signal.

* * * * *